FREQUENCY DOUBLER

Filed Aug. 21, 1964

INVENTOR.
THOMAS E. LASH

BY [signature]
ATTORNEY

United States Patent Office 3,261,991

Patented July 19, 1966

3,261,991

FREQUENCY DOUBLER

Thomas E. Lash, Sunnyvale, Calif., assignor to Sylvania Electric Products Inc., a corporation of Delaware Filed Aug. 21, 1964, Ser. No. 391,188

4 Claims. (Cl. 307—88.5)

This invention relates to frequency doublers and more particularly to a full wave rectifier type frequency doubler employing a load impedance having a conduction characteristic with a conduction region defined by a square law relationship.

The output of a full wave rectifier comprises even-numbered harmonic signals. According to prior art practice, the frequency of a signal applied to a full wave rectifier is doubled by filtering the output of the rectifier. The rectified signal is filtered by a tuned circuit that passes only the second harmonic. In order that all frequencies other than the second harmonic shall be blocked, the center frequency of the narrow band tuned circuit must be nearly equal to the second harmonic. The bandwidth of this frequency doubler is therefore limited by the tuned circuit which, at low frequencies, is also physically large.

An object of this invention is the provision of a relatively simple full wave rectifier frequency doubler that is operable over a broad band of frequencies.

Another object is the provision of a frequency doubler for operation at low frequencies that is relatively small and temperature stable.

Another object is the provision of a frequency doubler having low distortion in the output signal.

In accordance with this invention, the load impedance of a full wave rectifier is provided by a diode. The rectifying diodes and the load impedance diode each has a conduction characteristic having a conduction region defined by a square law relationship. When an input signal is applied to the rectifier, one of the rectifying diodes or the load impedance diode is biased into the conduction region defined by the square law relationship. The frequency of the output signal coupled from the load impedance diode is twice the frequency of the input signal.

These and other objects and the operation of this invention will become apparent from the following description of a preferred embodiment thereof, reference being had to the accompanying drawing in which.

Figure 1:
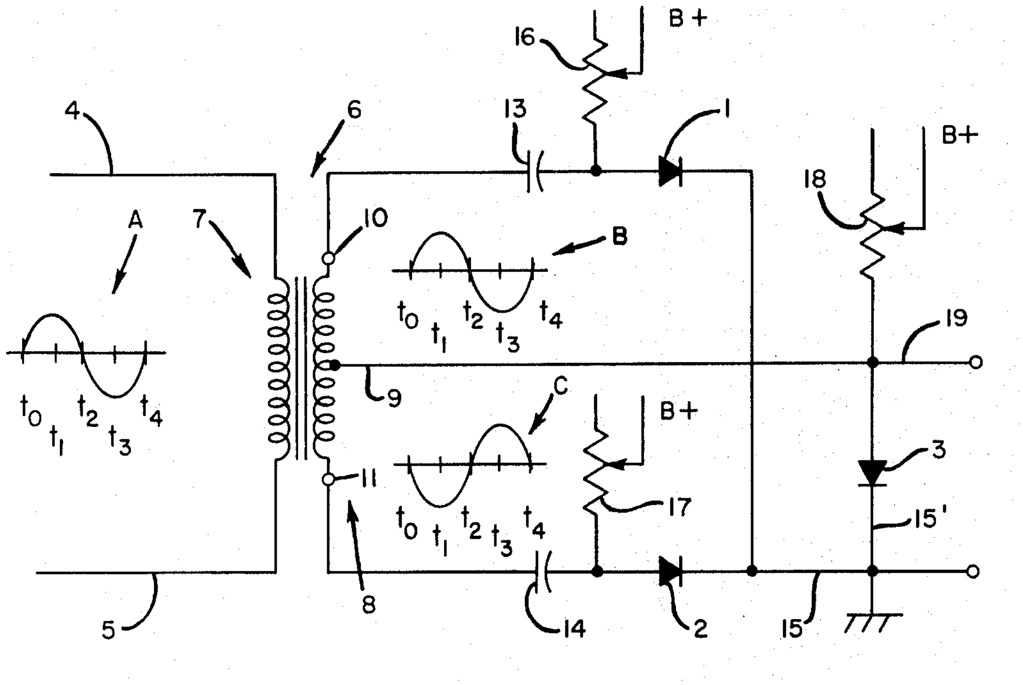
FIGURE 1 is a circuit diagram of a preferred embodiment of the invention.

Specific reference being had to FIGURE 1, the frequency doubler comprises a full wave rectifier having rectifying diodes 1 and 2 and a load impedance diode 3, each diode having an asymmetrical conduction characteristic.

A signal input is applied on lines 4 and 5 to a coupling transformer 6 comprising a primary winding 7 and a center-tapped secondary winding 8. The coupling transformer secondary winding 8 has a center tap 9, a first winding having a terminal 10 and a second winding having a terminal 11. The center tap 9 is connected to the anode of load impedance diode 3. The terminals 10 and 11 of secondary winding 8 are connected through A.C. coupling capacitors 13 and 14, respectively, to the anodes of rectifying diodes 1 and 2, respectively. The cathodes of diodes 1 and 2 are connected by line 15 to ground and the cathode of diode 3 is similarly connected to ground by line 15'.

The anodes of diodes 1 and 2 are connected through potentiometers 16 and 17, respectively, to a supply potential B+. The anode of load impedance diode 3 is connected through a potentiometer 18 to the positive supply potential B+. The output of the circuit is generated across the load impedance diode 3 and is coupled from the circuit on line 19.

Figure 2:
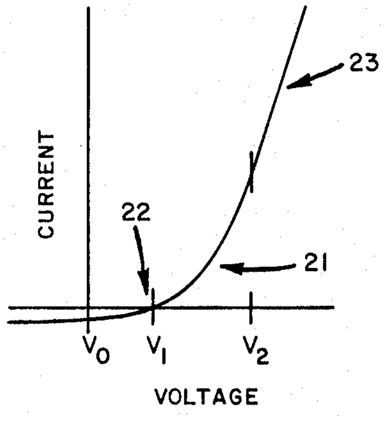
FIGURE 2 is a waveform illustrating the conduction characteristic of a typical diode.

A significant feature of this invention is that a diode has a conduction characteristic having a conduction region defined by a square law relationship as indicated at 21 in FIGURE 2. In other words, the output from the diode is the square of its input. If a sinusoidal input signal having a particular frequency $f$ is applied to the rectifier, the sinusoidal output signal is the square of the sinusoidal input signal. The sinusoidal output signal is also a function of sinusoidal signal whose frequency is twice the particular frequency $f$ as expressed mathematically by the trigonometric identity $$(\sin 2\pi f)^2 = \frac{1 - \cos 2(2\pi f)}{2}$$

In accordance with this invention, either the load impedance diode 3 or one of the rectifying diodes 1 or 2 is biased to operate in the conduction region that is defined by the square law relationship whenever an input signal is applied to the circuit. The output signal therefore obeys the square law relationship noted above.

Potentiometers 16 and 17 are initially adjusted so that a sufficient D.C. bias current flows through rectifying diodes 1 and 2, respectively, to bias the diodes at 22 in FIGURE 2, above the zero response delay region between $V_0$ and $V_1$. This D.C. bias current forward biases the rectifying diodes 1 and 2 so diode conduction is defined by the square law relationship when positive going and negative going input signals, respectively, are applied to the rectifying diodes. This biasing of the rectifying diodes above the zero response delay region reduces distortion that may be generated in the output signal.

Potentiometer 18 is initially adjusted to forward bias load impedance diode 3 so that conduction of the diode is defined by a linear relationship as indicated at 23 in FIGURE 2.

Consider that the sinusoidal input signal illustrated at A in FIGURE 1 is applied to the primary winding 7 of the coupling transformer. This sinusoidal input signal is coupled across the portion of the secondary winding between center tap 9 and terminal 10 "in phase" with the signal on primary winding 7 as indicated at B in FIGURE 1. The negative going signal between times $t_2$ and $t_4$ reverse biases and cuts off rectifying diode 1. Conversely, the sinusoidal input signal that is coupled across the portion of the secondary winding between center tap 9 and terminal 11 is 180° out-of-phase with the signal on primary winding 7 as indicated at C in FIGURE 1. The negative going signal C between times $t_0$ and $t_2$ reverse biases and cuts off rectifying diode 2.

The positive going signal (the waveform at B) on the secondary winding between times $t_0$ and $t_1$ is coupled across rectifying diode 1 and causes the rectifying diode forward bias to increase from the potential $V_1$, through the conduction region that is defined by the square law relationship indicated at 21, to the conduction region that is defined by the linear relationship indicated at 23. This change in potential generates an alternating conduction current that is returned to the upper half of the secondary winding through load impedance diode 3 since the rectifying diode 2 is reverse biased and cut off. This alternating current through diode 3 decreases the initial D.C. bias on the diode and causes the conduction region in which diode 3 operates to change from the linear conduction region indicated at 23 to the square law conduction region indicated at 21.

Conversely, the signal between times $t_1$ and $t_2$ (see the waveform at B) is coupled across rectifying diode 1 and causes the forward bias on diode 1 to decrease causing its operation in the conduction region which is defined by the linear relationship indicated at 23 to change to operation in the conduction region defined by the square law relationship indicated at 21. This change in potential causes a decreasing conduction current that is returned to primary winding 9 through load impedance diode 3. This current change increases the forward bias on diode 3 and causes its conduction characteristic to again be defined by the linear relationship indicated at 23. Thus, it is seen that conduction of diodes 1 and 3 during the time interval $t_0$ to $t_2$ are related so that at all times the operation of one or the other of the diodes obeys a square law relationship.

The rectifying diode 2 conducts through the load impedance diode 3 during the time $t_2$ to $t_4$ in the same manner as did rectifying diode 1 during the time $t_0$ to $t_2$.

By way of example, a full wave rectifier frequency doubler embodying this invention and having the following components and characteristics was constructed and successfully operated:

| | | |
|---|---|---|
| Diode **1** | | 1N14 |
| Diode **2** | | 1N14 |
| Diode **3** | | 1N14 |
| Potentiometer **16** | k__ | 74 |
| Potentiometer **17** | k__ | 75 |
| Potentiometer **18** | k__ | 75 |
| Capacitor **13** | μf__ | 22 |
| Capacitor **14** | μf__ | 22 |
| Transformer **7** | | UTC–X0–T20 |
| Potential B+ | v__ | +20 |

Signal inputs having frequencies between one kilocycle per second and ten kilocycles per second were applied to this circuit. The total harmonic distortion in the output of the frequency doubler was determined by measuring the output signal on a Hewlett-Packard 330B distortion analyzer. The distortion was less than 1.1% over the above frequency range.

Although this invention has been shown and described in relation to a preferred embodiment thereof, variations and modifications will be apparent to those skilled in the art. The scope and breadth of this invention is therefore to be determined from the following claims rather than from the above detailed description.

What is claimed is:

1. A full wave rectifier frequency doubler comprising
a coupling transformer having a primary winding and a secondary winding with a center tap and first and second terminals on opposite sides of said center tap,
means for applying an input signal to said primary winding,
a load impedance diode having a conduction characteristic having a first conduction region defined by a square law relationship and a second conduction region defined by a linear relationship, said load impedance diode having a first electrode electrically connected to said center tap of said secondary winding and having a second electrode connected to a reference potential,
first and second rectifying diodes having conduction characteristics having a first conduction region defined by a square law relationship and a second conduction region defined by a linear relationship, said rectifying diodes having first electrodes electrically connected to said first and second terminals, respectively, and each having a second electrode connected to the reference potential,
a power source, first and second bias elements connected between said power source and said first electrodes of said first and second rectifying diodes, respectively, for biasing said rectifying diodes in said square law conduction region,
a third bias element connected between said power source and said first electrode of said load impedance diode for biasing said load impedance diode in said linear conduction region, and
means connected across said load impedance diode for coupling an output from said frequency doubler.

2. A frequency doubler comprising
first and second rectifying elements each having an input responsive to an input signal for generating an output signal and having conduction characteristics with a conduction region defined by a square law relationship,
a load responsive to the output signals of said rectifying elements, said load having a conduction characteristic with a first conduction region defined by a square law relationship and a second conduction region defined by a linear relationship,
variable bias means for biasing said first and second rectifying elements whereby the rectifying elements operate in the region of the conduction characteristics defined by a square law relationship,
variable bias means for biasing said load whereby the load operates in the region of the conduction characteristic defined by a linear relationship, and
means for applying an input signal to said rectifying elements for varying the region of the characteristics in which said load and said rectifying elements operate.

3. The frequency doubler defined in claim 2 wherein said first and second rectifying elements and said load are diodes having asymmetrical conduction characteristics.

4. A frequency doubler comprising
a rectifier comprising
rectifying elements each responsive to an input signal for generating an output signal and each having a conduction characteristic having a conduction region defined by a square law relationship and a conduction region defined by a linear relationship, and
means for initially biasing said rectifying elements for operation in the square law region,
output generating means responsive to the output signals of said rectifying elements, said output generating means having a conduction characteristic having a conduction region defined by a square law relationship and a conduction region defined by a linear relationship,
means for initially biasing said output generating means in said linear conduction region, and
means for coupling an input signal to said rectifier for varying conduction of said rectifying elements and said output generating means between said linear and square law conduction regions for generating an output whose frequency is twice the frequency of the input signal.

References Cited by the Examiner

UNITED STATES PATENTS 2,972,064 2/1961 Hurlbut ____________ 307—88.5

ARTHUR GAUSS, *Primary Examiner.*

J. ZAZWORSKY, *Assistant Examiner.*